(12) United States Patent
Goss et al.

(10) Patent No.: US 9,718,505 B2
(45) Date of Patent: Aug. 1, 2017

(54) SPARE TIRE CARRIER DEVICE

(71) Applicant: Norco Industries, Inc., Compton, CA (US)

(72) Inventors: Thomas Michael Goss, Elkhart, IN (US); Timothy D. Schultz, Mishawaka, IN (US); Borivoj Krobot, LaPorte, IN (US)

(73) Assignee: Norco Industries, Inc., Compton, CA (US)

( * ) Notice: Subject to any disclaimer, the term of this patent is extended or adjusted under 35 U.S.C. 154(b) by 78 days.

(21) Appl. No.: 14/946,599

(22) Filed: Nov. 19, 2015

(65) Prior Publication Data

US 2016/0257354 A1    Sep. 8, 2016

Related U.S. Application Data

(60) Provisional application No. 62/126,959, filed on Mar. 2, 2015.

(51) Int. Cl.
*B62D 43/04*    (2006.01)
*B62D 43/00*    (2006.01)

(52) U.S. Cl.
CPC ......... *B62D 43/045* (2013.01); *B62D 43/002* (2013.01)

(58) Field of Classification Search
CPC ... B60R 22/201; Y10S 212/901; B66C 23/48; B62D 43/045; B62D 43/002; B62D 43/04; B62D 43/00; B62D 43/02
USPC .............................. 224/42.23, 42.21, 42.24
See application file for complete search history.

(56) References Cited

U.S. PATENT DOCUMENTS

| | | | | |
|---|---|---|---|---|
| 1,920,989 A | * | 8/1933 | Layhon ................... | B66C 23/48 212/343 |
| 3,539,152 A | * | 11/1970 | Paul ..................... | B62D 43/045 224/42.23 |
| 3,652,057 A | * | 3/1972 | Brown .................... | B66C 23/48 254/264 |
| 4,492,506 A | * | 1/1985 | Hoagland ............ | B62D 43/045 224/42.21 |
| 5,297,913 A | * | 3/1994 | Au ........................ | B62D 43/045 224/42.21 |

* cited by examiner

*Primary Examiner* — Adam Waggenspack
(74) *Attorney, Agent, or Firm* — Kevin R. Erdman; Brannon Sowers & Cracraft PC

(57) ABSTRACT

The present invention involves a spare tire carrier and handling device for mounting on a vehicle. The device is adapted for moving a spare tire between a stored position under a vehicle to an accessible position. The device may be mounted so as to be accessible from the rear, side, or front of a vehicle as desired.

18 Claims, 14 Drawing Sheets

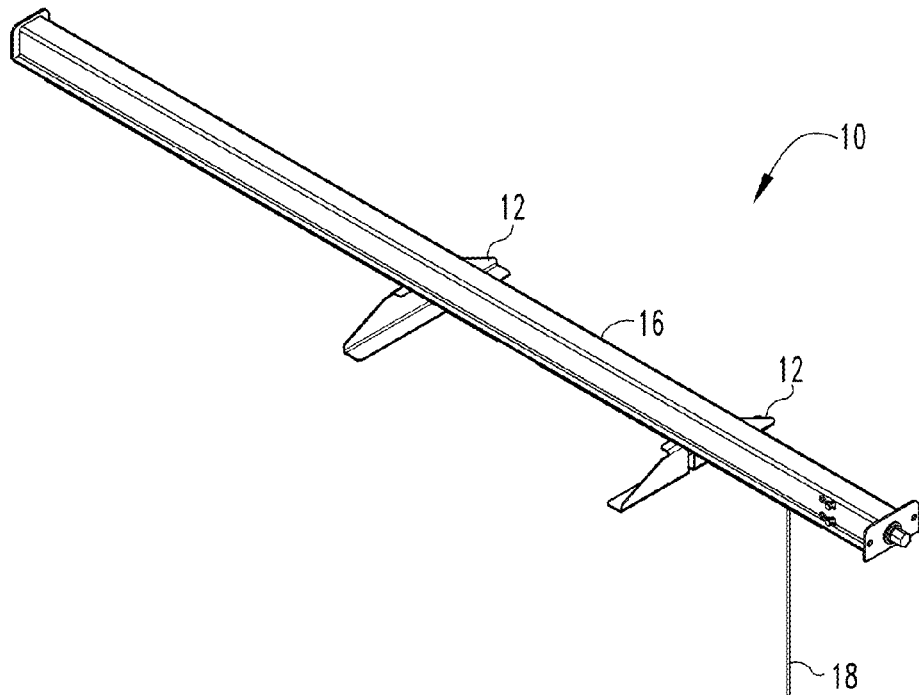
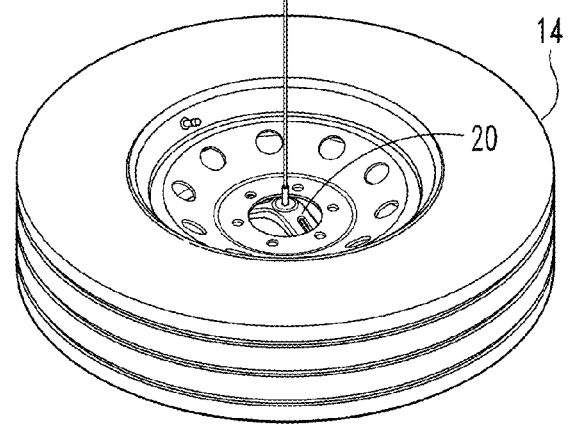
Fig. 2

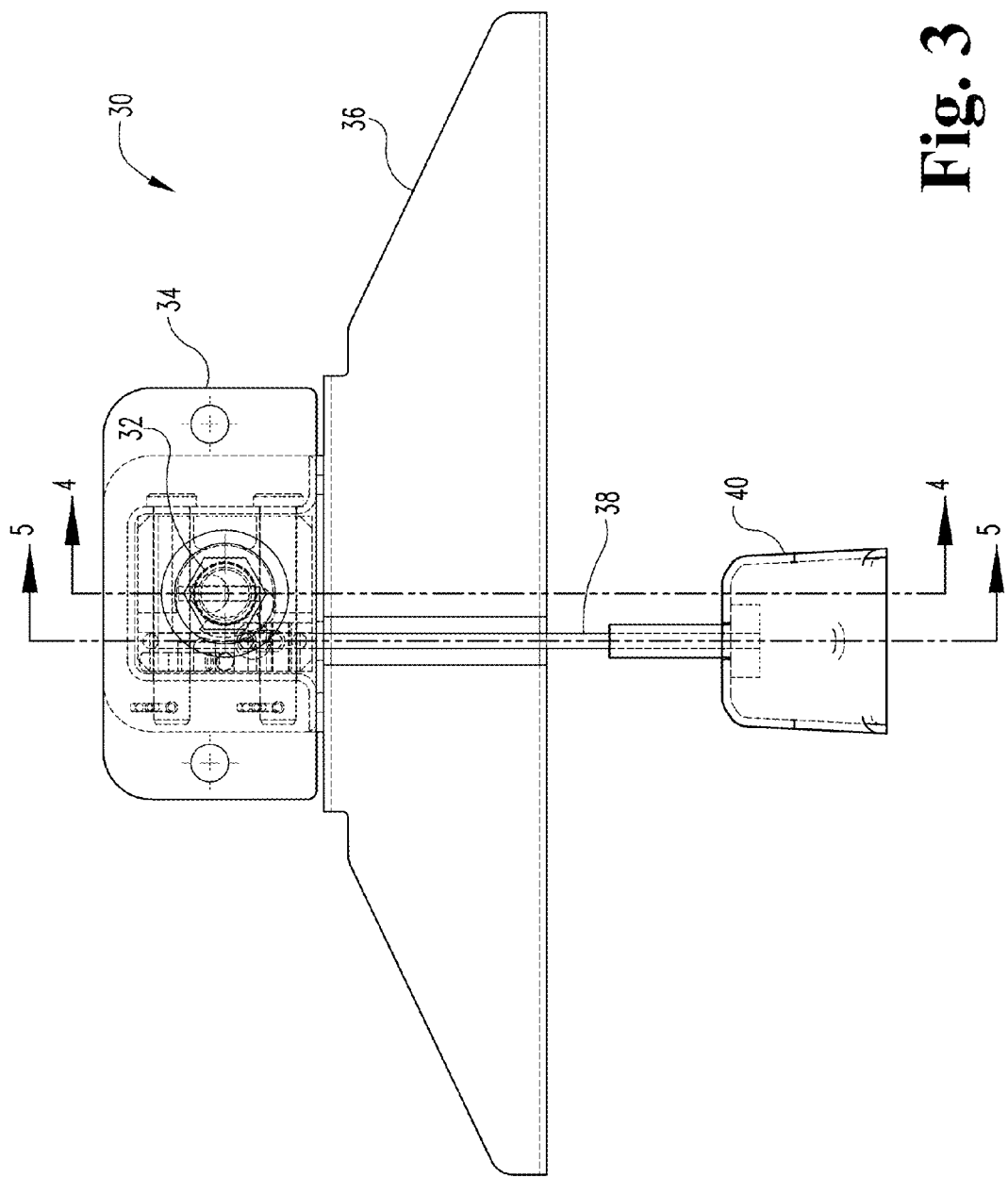

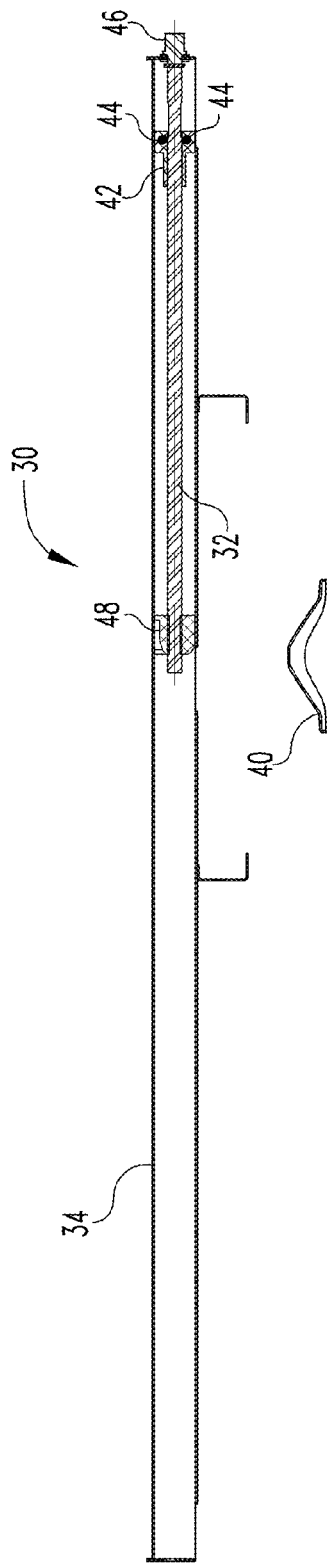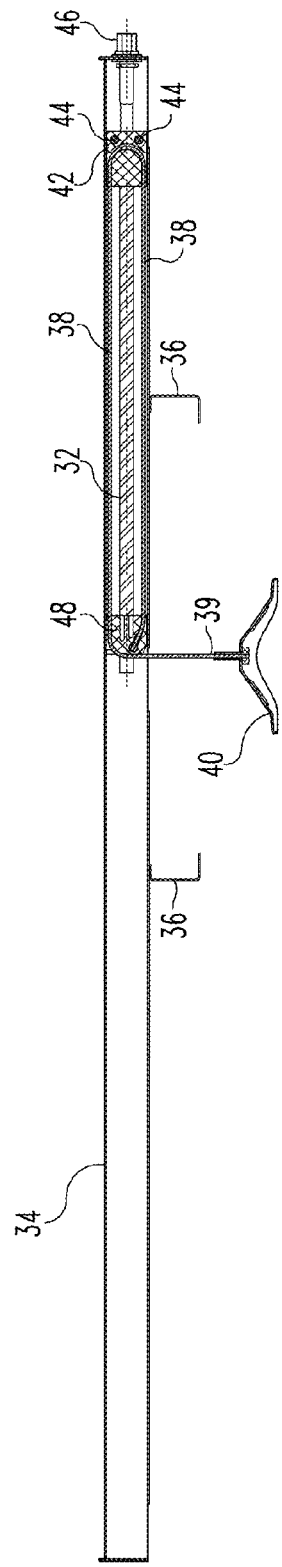

SPARE TIRE CARRIER DEVICE

CROSS-REFERENCE TO RELATED APPLICATIONS

The present application claims priority under 35 U.S.C. §119(e) of U.S. Patent Provisional Application Ser. No. 62/126,959, filed Mar. 2, 2015, the disclosures of which is incorporated by reference herein.

FIELD OF THE INVENTION

The present invention generally relates to a spare tire handling device for a vehicle and, more particularly, to a tire carrier with a retractable wheel retainer for a vehicle.

BACKGROUND

Spare tire handling devices with one-piece wheel retainers which store the spare tire under a vehicle are well known in the prior art. These devices allow spare tires to be stored outside of the vehicle compartment and are commonly used in vehicles which have larger spare tires and in vehicles which lack interior space in which to store a tire. Such designs are commonly used on larger vehicles such as trucks, campers, recreational vehicles, and the like.

These devices typically include a winch, cable, and tire retainer upon which the spare tire rests. Typically the device stores the spare tire under the rear of the vehicle, often at some point behind the rear wheels but before the end of the vehicle, although the device may be mounted at any other convenient point under a vehicle where it will not interfere with the vehicle's systems. The winch may be operated manually, typically by a detachable hand crank, or by an electrical motor. When operated, the winch is cranked and the tire lowered to the ground by the cable. When the tire is resting on the ground the tire may be detached from the retaining device. Optionally, the flat tire being replaced may be put onto the retaining device and the flat tire raised into the stored position under the vehicle for transport until it may be repaired or replaced.

Such spare tire storage devices or carriers are simple and efficient, but have several drawbacks. These devices operate entirely under the vehicle's footprint meaning that the operator must reach under the vehicle to retrieve the spare tire even when it is in the lowered position. Many of the vehicles using such systems have larger than normal tires meaning the operator must reach under the vehicle and attempt to drag a very heavy tire out from under the vehicle while crouching in an awkward position. The spare tire must also be disconnected from the storage device which may require the operator to crawl under the vehicle to operate the tire retaining device. The flat tire must then be pushed back under the vehicle and reconnected to the retaining device to be lifted back into the storage position. The drawbacks of the present tire retaining systems typically leave the operator dirty and tired after having to crawl under the vehicle multiple times to change a single tire.

SUMMARY

The present invention involves an assembly for retaining a spare tire and wheel on the underside of a vehicle. The assembly includes a tire retainer, a flexible device, two blocks and a threaded rod. The tire retaining device is adapted to engage the spare tire and wheel. The flexible device has a first end attached to the tire retaining device and a second end connected to one of the blocks. One of the blocks is configured to be fixedly connected to the vehicle. The other block is configured to be moveably connected to the vehicle. The threaded rod is configured to be attached to the vehicle, and capable of rotating within the first block and threadedly engaging the other or second block. This allows the flexible device to have a second end connected to one of the first and second blocks, such that rotation of the rod causes movement of the second block relative to the first block to change the position of the tire retaining device.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2 is a perspective view of a tire carrier of FIG. 1 in the deployed position.

FIG. 3 is a partial cut away view of a tire carrier according to one embodiment of the present invention.

FIG. 4 is a partial cut away view of a tire carrier of FIG. 3 along line 4.

FIG. 5 is a partial cut away view of a tire carrier of FIG. 3 along line 5.

Figure 1:
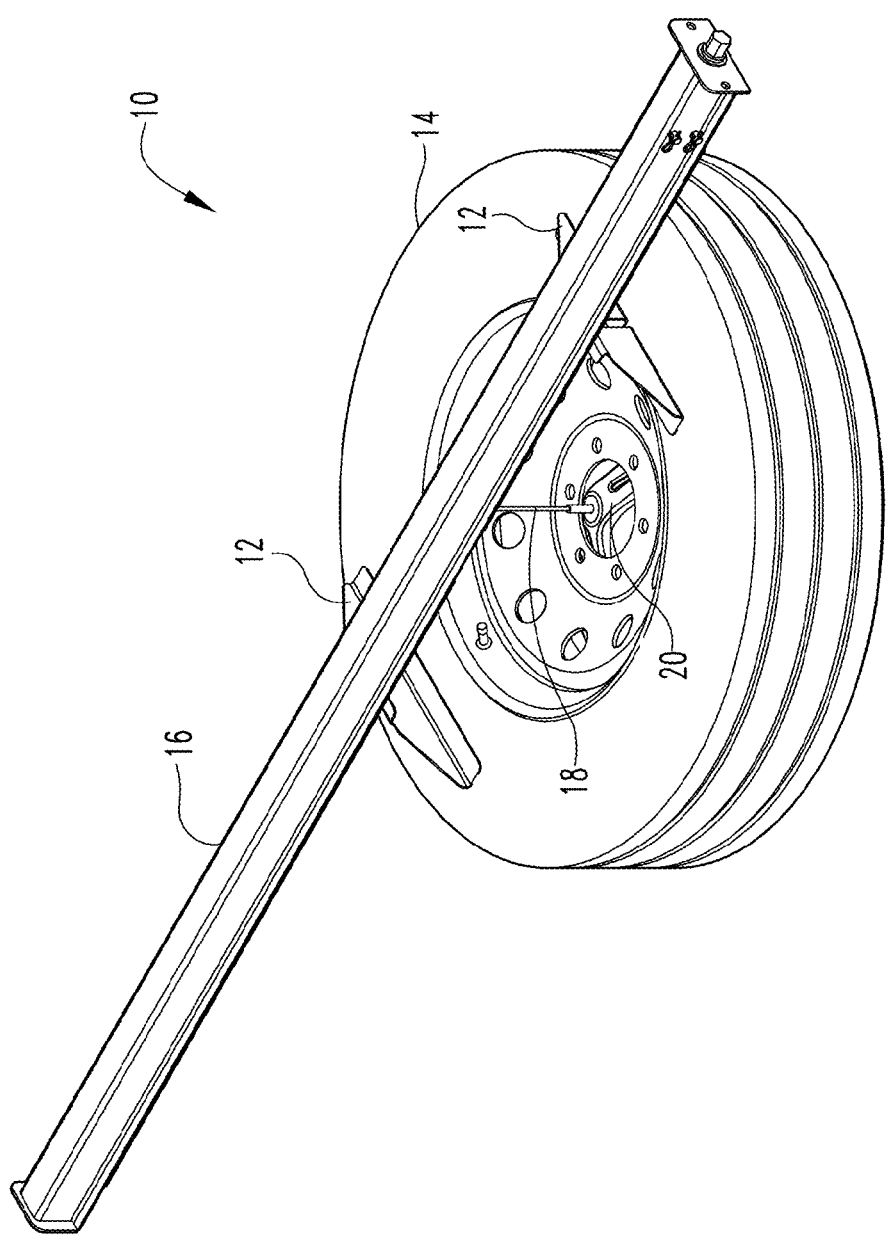
FIG. 1 is a perspective view of a tire carrier in the stored position according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Generally, the embodiments of the tire storage and carrier system of the present invention involve mounting to the underside of a vehicle, typically a larger vehicle such as a truck, camper, recreational vehicle, and the like. Such vehicles typically include a spare tire, comprising a tire inflated on a wheel. The carrier device is typically mounted to the rear underside of the vehicle, but other locations where the equipment does not interfere with the operation of the vehicle's systems on the underside of the vehicle such as the side or front may also be contemplated. The carrier device comprises a channel which houses a winch-type system. The winch comprises a threaded rod which passes through at least one fixed support and at least one slidable support or threaded block. The threaded rod is accessible to an operator at some point on the side of the vehicle. The rod may be turned manually using a removable mounted crank, handle, or other suitable tool. Optionally, the rod may be adapted to be turned using a powered device such as a drill, impact driver, or other device. In other embodiments, the rod is operated by an electric motor or other power source provided by the vehicle itself.

A cable is connected proximate to and/or on the fixed support and passes over or through the slidable support block. In other embodiments the cable is replaced with another type of flexible member such as a chain, belt, rope etc. Optionally, the sliding support block includes a pulley or other device to reduce wear on the cable. The free end of the cable then passes over or through the sliding block and out of a slot in the bottom of the channel. The free end of the cable is then connected to a tire retaining device. The exact nature of the tire retaining device may vary, but such devices are well known in the industry.

In other embodiments. The cable is fixed at one end to the slidable support block, passes around the fixed support block, and passes over the slidable support block forming a loop. The free end then passes over or through the slidable block and out of the channel to be connected to a tire retaining device. In still other embodiments, the cable is replaced by a chain, belt, or other suitable linkage.

When operated, the threaded rod is turned in one direction which urges the slidable block towards the fixed block. Typically this means urging the slidable block towards the rear of the vehicle but in other configurations the slidable block may be urged towards the side or front of the vehicle depending on the position of the fixed block. As the slidable block moves towards the fixed block, the cable slides over/through the slidable block and out of the slot positioned at the bottom of the channel. As the cable pays out through the slot, gravity draws the tire retaining device (and the tire, if attached) downwards towards the ground. As the slidable block moves towards the fixed block, the position at which the cable exits the channel through the slot also moves closer relative to the fixed block. This means as the threaded rod is turned so as to move the tire to the deployed position from the stored position, the tire and tire retaining device is lowered towards the ground and simultaneously closer to the rear of the vehicle (if the system is installed with the fixed block near the rear of the vehicle). When in the deployed position, the tire is resting on the ground and at least part of the tire is not under the vehicle body. More detailed description of several embodiments follow and are show in the additional figures.

FIGS. 1 and 2 show one embodiment of the present invention in the form of carrier 10 in the stowed position (FIG. 1) and in the deployed position (FIG. 2). In this particular embodiment, tire 14 is retained by retaining device 20 which is connected to cable 18 (which may be a chain, belt, rope, or flexible member in alternative embodiments not shown). When in the stowed position, tire 14 is stabilized by a pair of supports 12 mounted to channel 16. Optionally, more or fewer supports may be used as desired. In this embodiment, channel 16 is shown as having a length of box beam, but other shapes and configurations may also be used as desired.

FIG. 3 is an end view of another embodiment of the present invention in the form of carrier 30. FIG. 4 is a partial cut away view of FIG. 3 as taken along line 4-4. FIG. 5 is a partial cut away view of FIG. 3 as taken along line 5-5. In this particular embodiment, carrier 30 has channel 34 which houses threaded rod 32. Rod 32 threadably engages fixed block 42 which is secured to channel 34 by bolts or pins 44. Such pins may be removable so as to allow rod 32 and other components of carrier 30 to be removed from channel 34 and serviced/replaced. Rod 32 has mounting point 46 which is accessible from the rear of the vehicle in this particular example (although it may be accessible from the side or the front of a vehicle in other examples). Mounting point 46 allows rod 32 to be turned by an operator using a removable crank, handle, motor, or other suitable device (not shown). Rod 32 is also threadably engaged with sliding threaded block 48. When turned in one direction, rod 32 urges sliding block 48 towards fixed block 42 (i.e.—towards the rear of the vehicle in this example). When turned in the opposite direction, rod 32 urges sliding block 48 away from fixed block 42 (i.e.—towards the front of the vehicle in this example).

Cable 38 is attached at one end to sliding block 48, passes around fixed block 42 (optionally by passing over a pulley mounted in the block), and passes back over sliding block 48 where free end 39 of cable 38 passes out of the channel 34 through a slot (not shown in this view) in the bottom of channel 34. Free end 39 is then attached to tire retainer 40. Optionally, one or more tire stabilizers 36 may be mounted to channel 34, wherein stabilizers 36 are configured to extend below channel 34 and abut a portion of a tire (not shown in this view) to restrain the movement of any tire positioned upon retainer 40. Operation of this embodiment is similar to that previously discussed.

Figure 6:
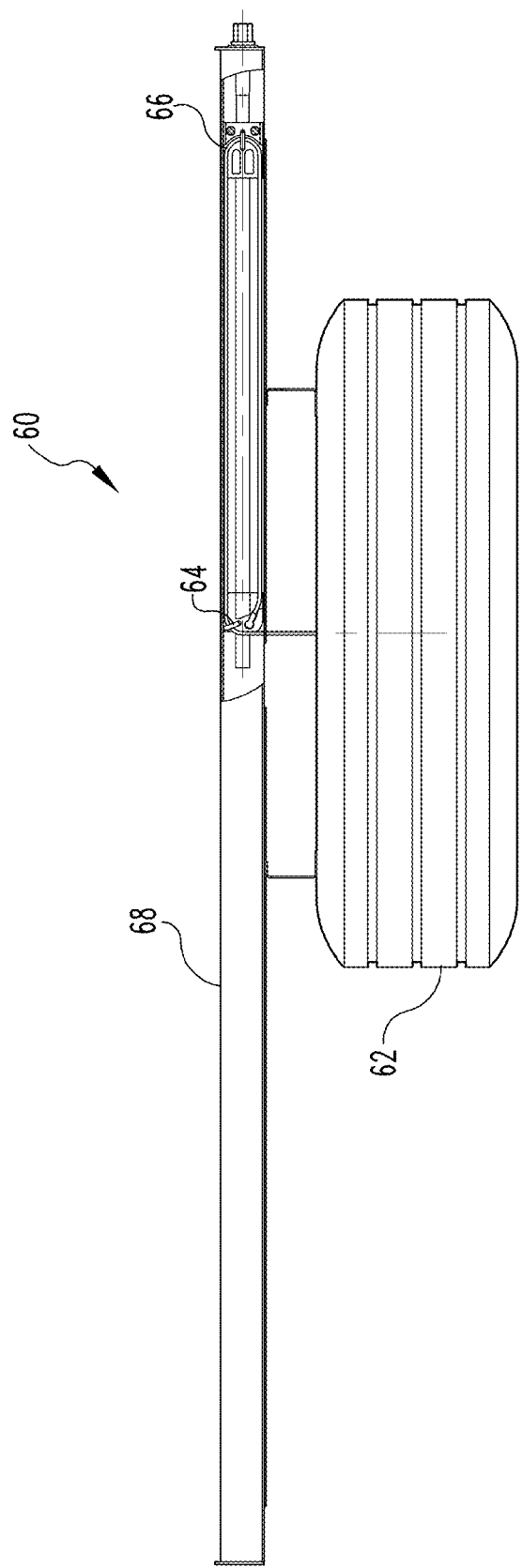
FIG. 6 is a partial cut away view of a tire carrier according to one embodiment of the present invention.
Figure 7:
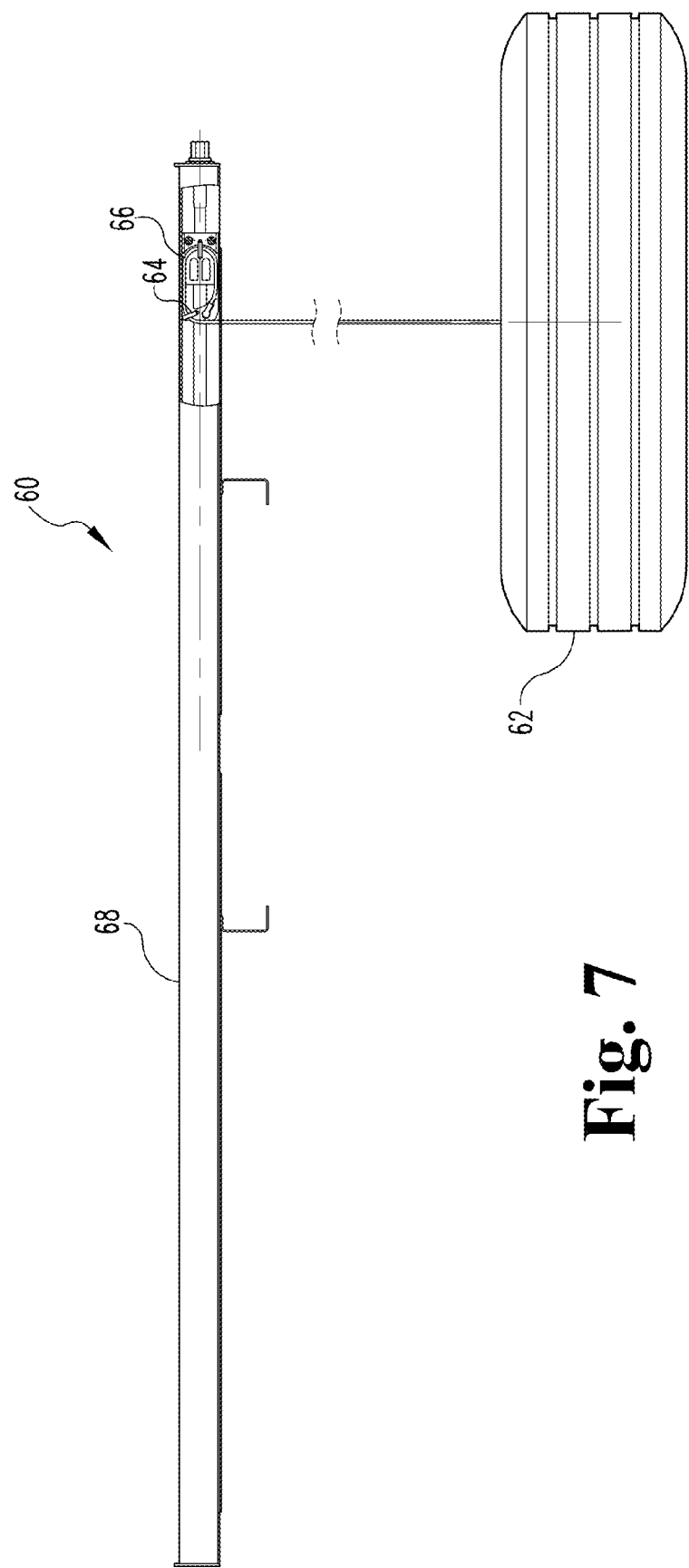
FIG. 7 is a partial cut away view of a tire carrier according to one embodiment of the present invention.
Figure 8:
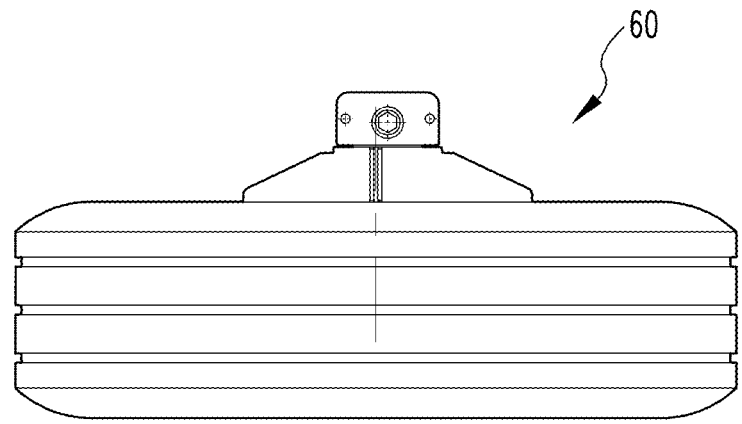
FIG. 8 is a rear view of a tire carrier in the stored position according to FIG. 6.
Figure 9:
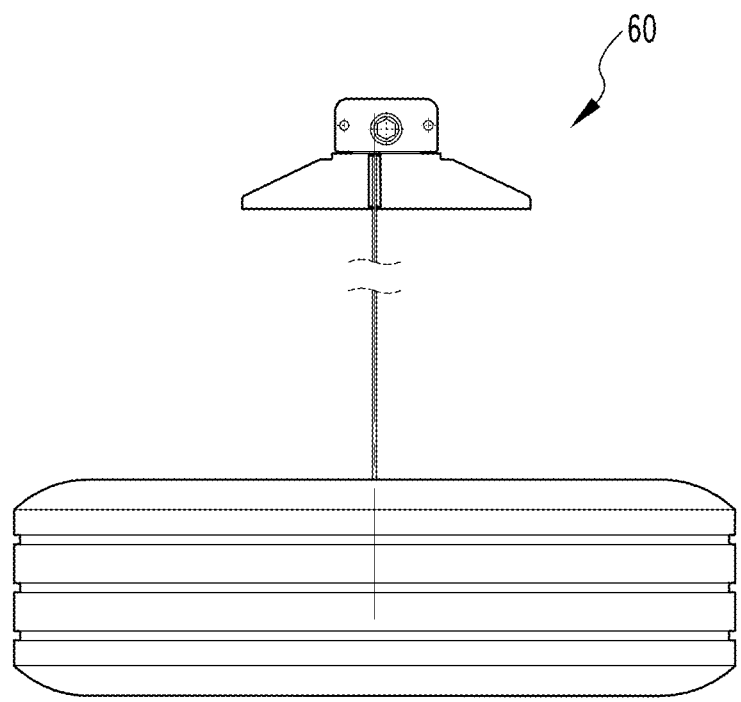
FIG. 9 is a rear view of a tire carrier in the deployed position according to FIG. 7.

FIGS. 6 and 7 show another embodiment of the present invention represented by carrier 60 with a tire in the stowed position (FIG. 6) and the deployed position (FIG. 7). These views illustrate how tire 62 moves both down (i.e.—away from channel 68) and towards fixed block 66 as sliding block 64 is moved towards fixed block 66. FIGS. 8 and 9 show an end view of carrier 60 shown in FIGS. 6 and 7, respectively.

Figure 10:
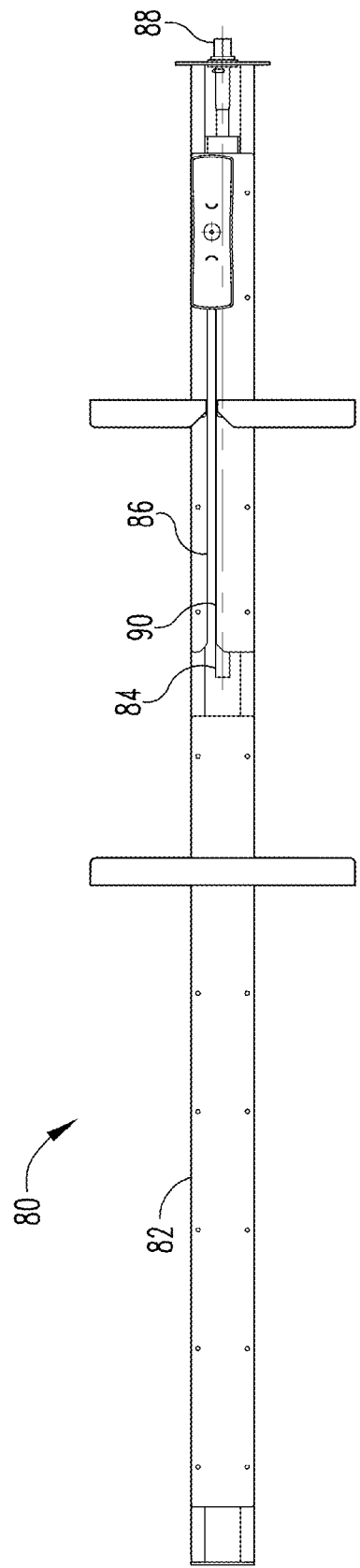
FIG. 10 is a bottom plan view of a tire carrier according to one embodiment of the present invention.

FIG. 10 is a bottom plan view of another embodiment of the present invention. In this embodiment, carrier 80 has channel 82 which houses threaded rod 84 which is accessible at one end 88. In this particular view, slot 86 through which cable 90 passes out from channel 82 is visible. The width and length of the slot may vary from embodiment to embodiment as desired.

Figure 11:
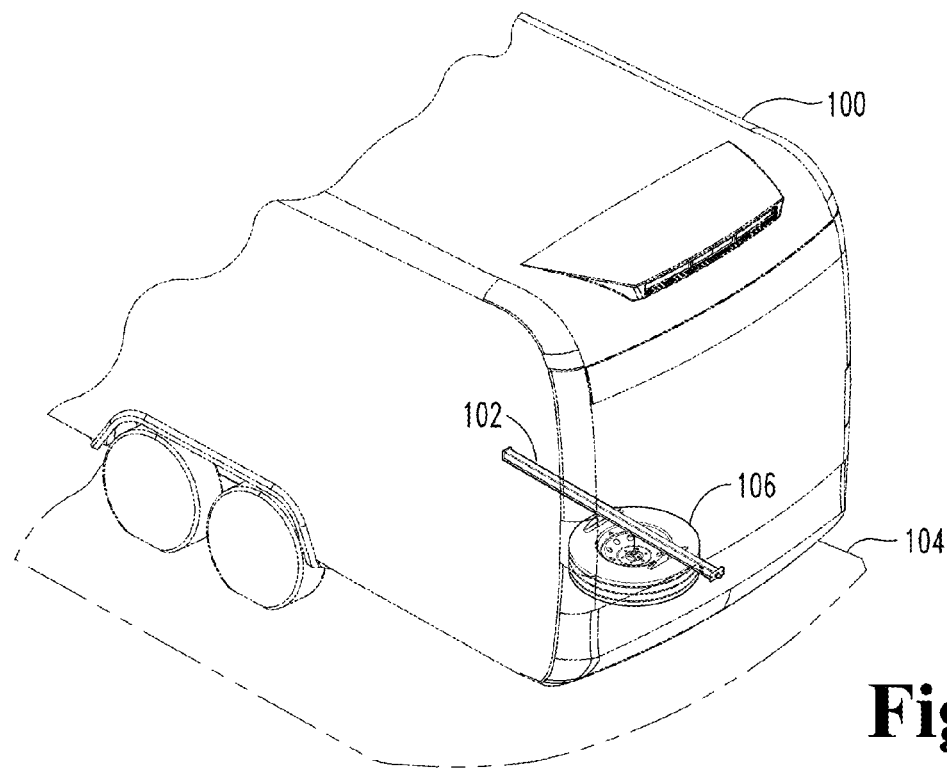
FIG. 11 is a perspective view of a tire carrier according to one embodiment of the present invention in the stored position.
Figure 12:
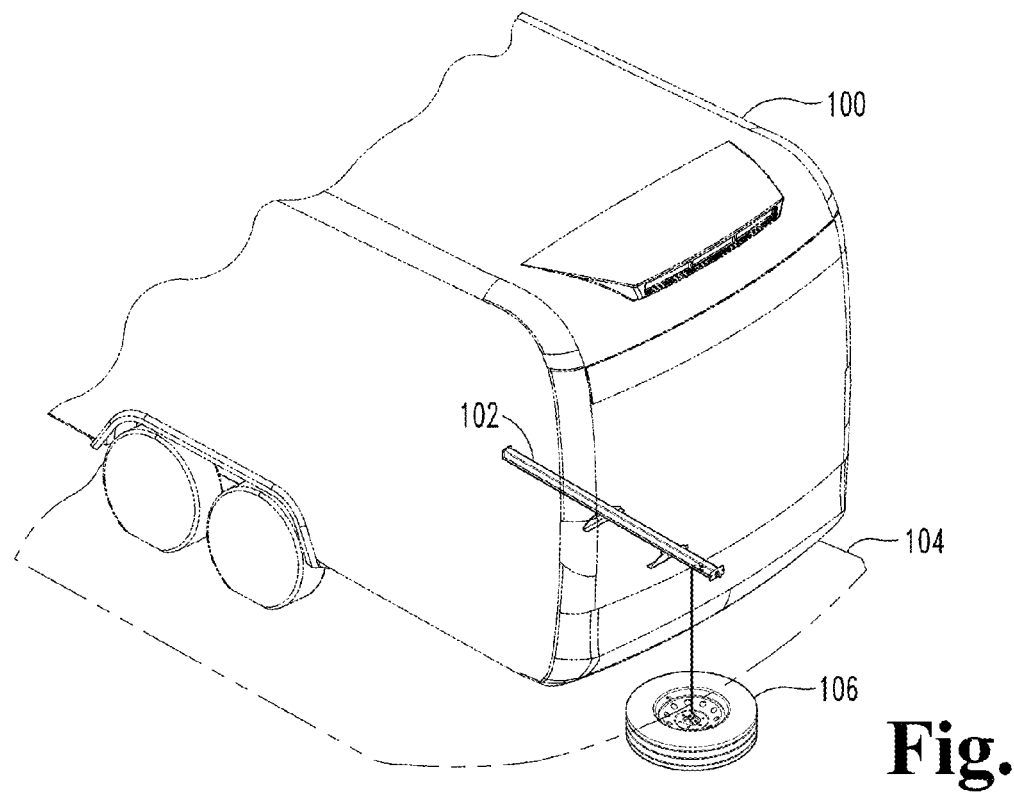
FIG. 12 is a perspective view of a tire carrier according to one embodiment of the present invention in the deployed position.

FIGS. 11 and 12 show another embodiment of the present invention in the stowed (FIG. 11) and deployed (FIG. 12) positions. In this example, vehicle 100 is shown in outline. Vehicle 100 sits above a portion of ground 104 and is stationary. When carrier 102 is in the stowed position, tire 106 is deployed against device 102 and under vehicle 100. When in the deployed position, tire 106 is not only lowered away from the vehicle underbody but may be at least partially out from under vehicle 100 and thereby easier for an operator (not shown) to reach and manipulate. The exact proportion of tire 106 which is not under vehicle 100 when in the deployed portion may vary from embodiment to embodiment.

Figure 13:
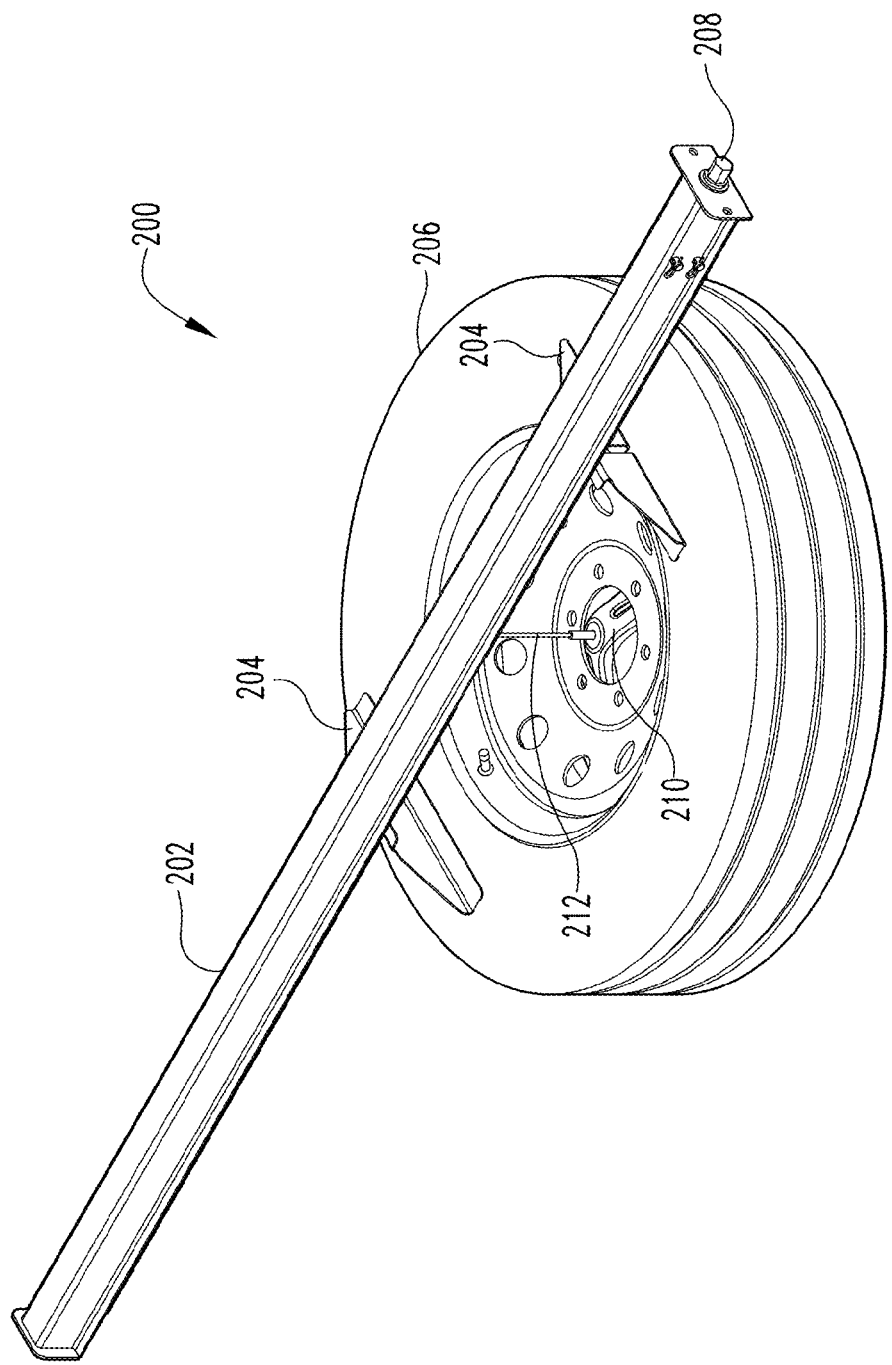
FIG. 13 is a perspective view of a tire carrier in the stored position according to one embodiment of the present invention.
Figure 14:
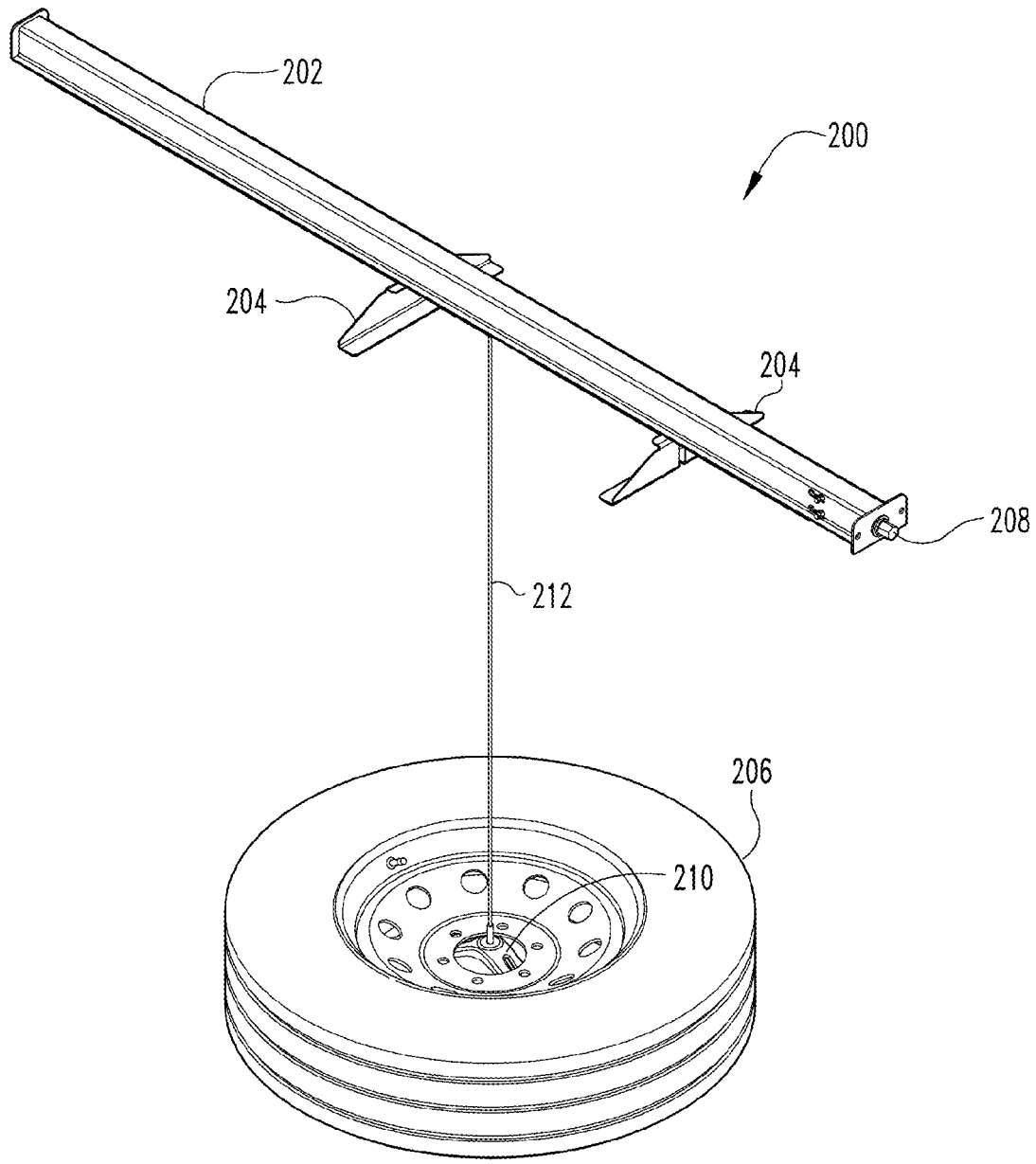
FIG. 14 is a perspective view of a tire carrier of FIG. 13 in the deployed position.

FIGS. 13 and 14 show another embodiment of the present invention in the form of carrier 200, showing both the stowed position (FIG. 13) and the deployed position (FIG. 14). In this particular embodiment, tire 206 is retained by retaining device 210 which is connected to cable 212. When in the stowed position, tire 206 is stabilized by a pair of supports 204 mounted to channel 202. Optionally, more or fewer supports may be used as desired. In this embodiment, channel 202 is shown as a length of box beam, but other shapes and configurations may also be used as desired. Threaded rod 208 for raising and lowering tire 206 is positioned at one end of channel 202. In this particular example, tire 206 is in the same position relative to the length of channel 202 when in the lowered position (FIG. 14) as it is when in the raised position (FIG. 13).

Figure 15:
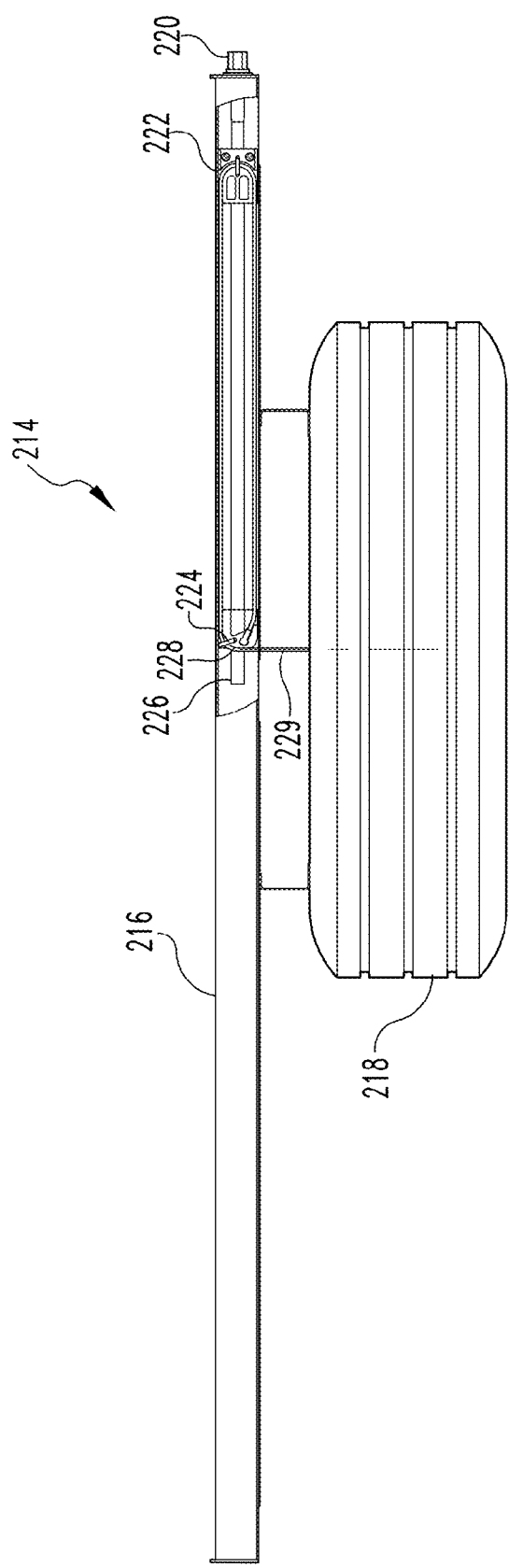
FIG. 15 is a partial cut away view of a tire carrier according to one embodiment of the present invention.
Figure 16:
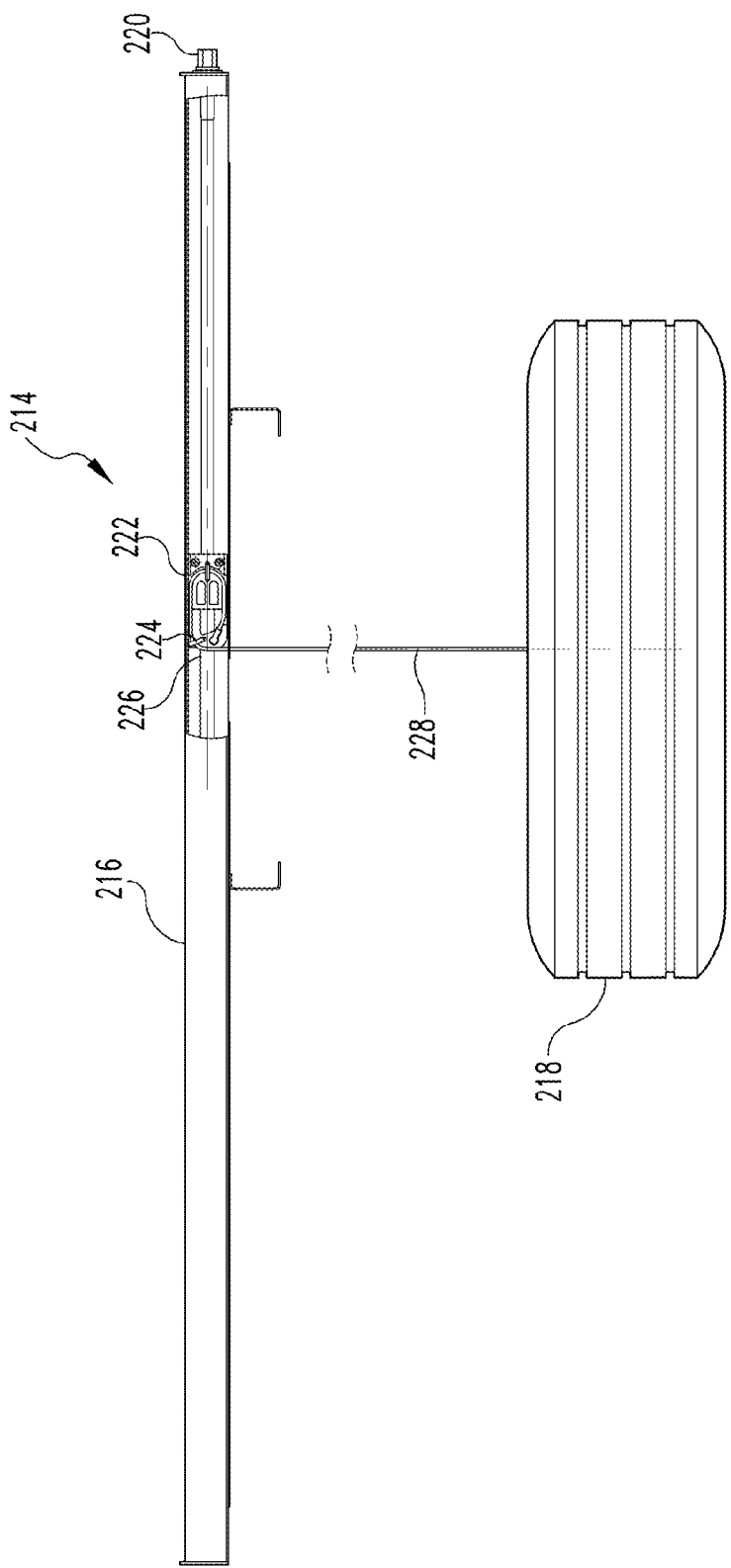
FIG. 16 is a partial cut away view of a tire carrier of FIG. 15 in the deployed position.

FIGS. 15 and 16 are partial cut away views of another embodiment of the present invention in the form of carrier 214. In this particular embodiment, channel 216 houses threaded rod 226. Rod 226 threadably engages fixed block 224 which is secured to channel 216 by bolts, pins, or another suitable securing mechanism. Optionally, threaded rod 226 may pass completely through or only partially through fixed block 224 so long as rod 226 is able to rotate. Such securing mechanisms may be removable so as to allow rod 226 and other components of device 224 to be removed from channel 216 and serviced/replaced. Rod 226 has mounting point 220 which may be positioned on a vehicle so as to be accessible from the vehicle exterior in this particular example. Mounting point 220 allows rod 226 to be turned by an operator using a removable crank, handle, motor, or other suitable device. Rod 226 is also threadably engaged with sliding threaded block 222. Cable 228 is attached at one end either proximate to or directly to fixed block 224, passes around sliding block 222 (optionally by passing over a pulley mounted in the block), and passes back over fixed block 224 where free end 229 of cable 228 passes out of channel 216 through a slot or other opening in the bottom of channel 216. Free end 229 is then attached to a tire retainer (not shown in this figure) which supports tire 218. Optionally, one or more tire stabilizers may be mounted to the channel. In an alternate embodiment, the cable is fixed at one end to the sliding block, slidably passes over the fixed block, and is fixed at the opposite end to a tire retainer.

When turned in one direction, rod 226 urges sliding block 222 towards fixed block 224 (i.e.—away from mounting point 220 in this example). When turned in the opposite direction, rod 226 urges sliding block 222 away from fixed block 224 (i.e.—towards mounting point 220 in this example). In this particular embodiment, when tire 218 is moved from the stowed position (FIG. 15) to the lowered position (FIG. 16), tire 218 remains substantially in the same position relative to the length of channel 216. That is, tire 218 is lowered directly to the ground rather than being both lowered and moved closer to mounting point 220 such as in the embodiments described in FIGS. 1-12.

Figure 17:
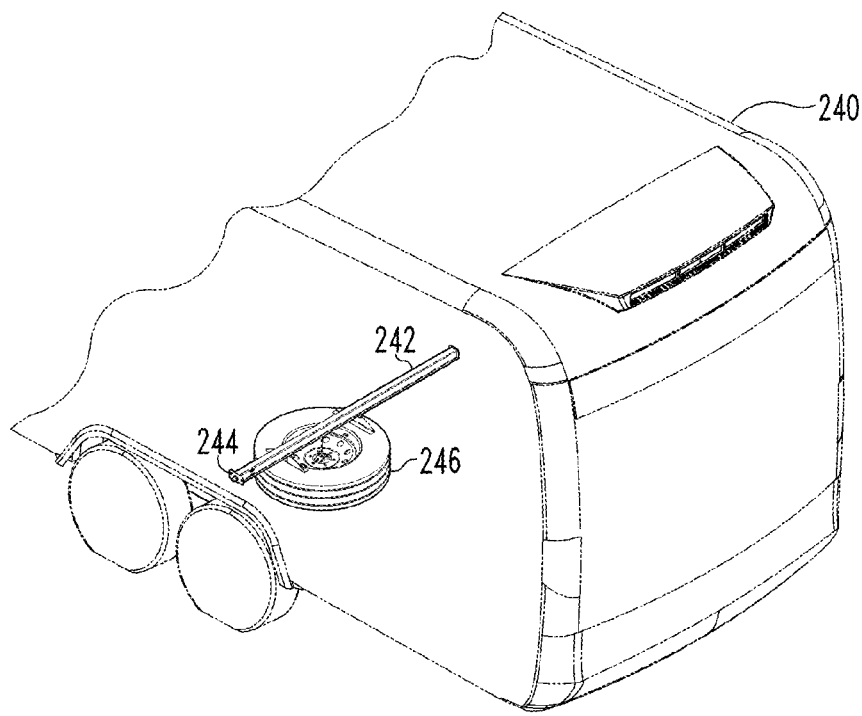
FIG. 17 is a perspective view of a tire carrier according to one embodiment of the present invention in the stored position.
Figure 18:
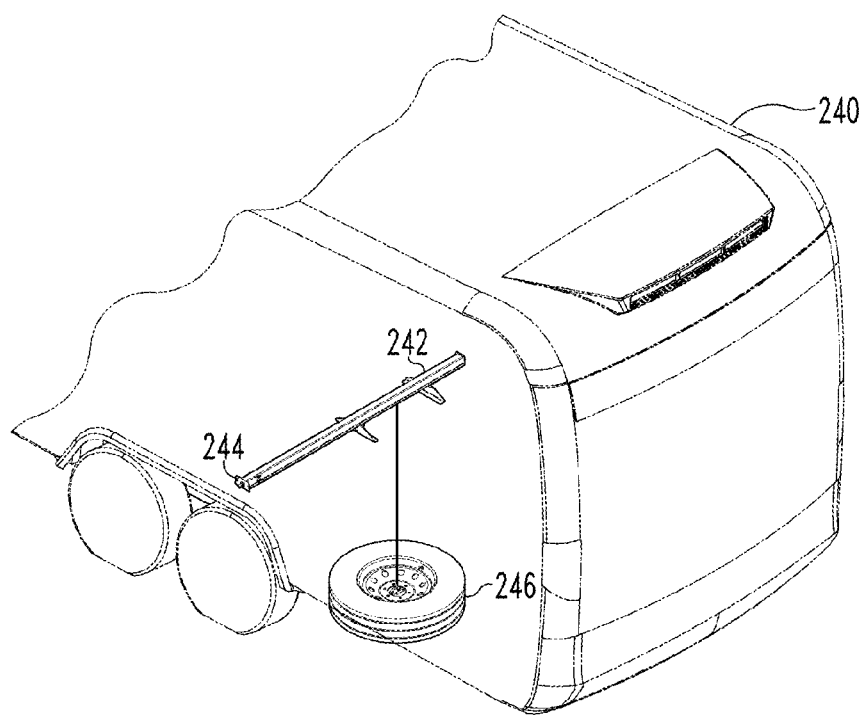
FIG. 18 is a perspective view of a tire carrier according to FIG. 17 in the deployed position.

FIGS. 17 and 18 show another embodiment of the present invention having both stowed (FIG. 17) and deployed (FIG. 18) positions. In this example, vehicle 240 is shown in outline. When carrier 242 is in the stowed position, tire 246 is deployed against device 242 and fully under vehicle 240 (i.e., fully within the boundary of the outer perimeter of vehicle 240). When in the deployed position, tire 246 is lowered away from the underbody of vehicle 240 towards the ground where it may be removed by an operator (not shown). In this particular embodiment, tire 246 is in substantially the same position relative to device 242 when in the stowed position (FIG. 17) and the deployed position (FIG. 18) in contrast with the embodiment shown in FIGS. 11 and 12. In this particular example, mounting point 244 of device 242 may be mounted to the side of vehicle 240. In other examples mounting point 244 may be mounted to the rear or front of vehicle 240 as desired.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A spare tire handling system configured to be mounted on a vehicle, comprising:
   a channel;
   a fixed block mounted within said channel;
   a sliding block slidably contained within said channel;
   a threaded rod disposed within said channel, said rod threadably passing through said sliding block, rotatably engaged with said fixed block, and having one end accessible from outside said channel;
   a cable passing over and contacting said fixed block and having two ends, one end secured to said sliding block and the other end secured to a tire retaining device located outside of said channel;
   wherein turning said threaded rod in a first direction moves said sliding block towards said fixed block;
   wherein turning said threaded rod in a direction opposite said first direction moves said sliding block away from said fixed block.

2. The system of claim 1, wherein the channel is configured to be mounted to the underside of a vehicle.

3. The system of claim 2, wherein said accessible end of said threaded rod is positioned within said channel so as to be accessible from a side of the vehicle.

4. The system of claim 2, wherein said accessible end of said threaded rod is positioned within said channel so as to be accessible from the rear of the vehicle.

5. The system of claim 1, wherein said threaded rod passes through said fixed block.

6. The system of claim 1, further comprising at least one tire stabilizer mounted to said channel.

7. A spare tire handling system configured to be mounted on a vehicle and adapted for moving a spare tire between a stowed and a deployed position relative to the vehicle, the system including:
   a threaded rod member;
   a threaded block movably connected to said threaded rod member;

a fixed block member rotatably connected to said threaded rod member;

a cable member secured at one end proximate to said fixed block member such that it contacts said fixed block member and slidably engaged with said threaded block member;

a tire retaining member operably connected to said cable and configured to engage a spare tire;

wherein turning the threaded rod member in one direction moves the threaded block towards the fixed block member thereby lowering the tire retaining member to a deployed position;

wherein turning the threaded rod member in the opposite direction moves the threaded block away from the fixed block member thereby raising the tire retaining member to a stowed position.

8. The spare tire handling system of claim 7, wherein the threaded rod member is configured for engagement with a hand crank, wherein the hand crank may be removably mounted to the rod on the side of the vehicle to turn the threaded rod.

9. The spare tire handling system of claim 7, wherein the threaded block is positioned such that a tire mounted to said tire retaining member when in the stowed position is completely under the vehicle and when in the deployed position is only partially under the vehicle.

10. The spare tire handling system configured to be of claim 7, wherein the threaded rod member is configured to be engageable by a hand crank from the rear of the vehicle.

11. A spare tire handling system mounted on a vehicle, comprising:
  a threaded rod member;
  a threaded block movably connected to the threaded rod member;
  a fixed block member rotatably connected to the threaded rod member;
  a flexible member secured at one end to one block member and slidably engaged with the other block member;
  a tire retaining device operably connected to the flexible member;
  wherein turning the threaded rod member in one direction moves the threaded block member towards the fixed block member thereby lowering the tire retaining device to a deployed position;
  wherein turning the threaded rod member in the opposite direction moves the threaded block member away from the fixed block member thereby raising the tire retaining device to a stowed position.

12. The system of claim 11, wherein the flexible member is selected from the group including a cable, a chain, a belt, and a rope.

13. The system of claim 11, wherein the flexible member is secured to the fixed block and slidably engaged with the threaded block.

14. The system of claim 11, wherein the flexible member is secured to the threaded block and slidably engaged with the fixed block.

15. The system of claim 11, wherein the threaded rod member, the threaded block, and the fixed block are disposed within a channel which is configured to be mounted to the underside of a vehicle.

16. The system of claim 15, wherein the channel is mounted to the vehicle such that one end of the threaded rod may be engaged by a hand crank and turned by the hand crank from the side of the vehicle.

17. The system of claim 15, wherein the channel is mounted to the vehicle such that one end of the threaded rod may be engaged by a hand crank and turned by a hand crank from the rear of the vehicle.

18. The system of claim 11, wherein the fixed block member is configured so that a tire mounted to the tire retaining device when in the stowed position is completely under the vehicle and when in the deployed position is only partially under the vehicle.

\* \* \* \* \*